United States Patent
Kuo

(10) Patent No.: US 9,020,020 B2
(45) Date of Patent: Apr. 28, 2015

(54) SYSTEM AND METHOD FOR A KRYLOV METHOD SYMBOL EQUALIZER

(71) Applicant: Broadcom Corporation, Irvine, CA (US)

(72) Inventor: Chun-Hsuan Kuo, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 115 days.

(21) Appl. No.: 13/680,455

(22) Filed: Nov. 19, 2012

(65) Prior Publication Data

US 2014/0140376 A1 May 22, 2014

(51) Int. Cl.
*H04B 1/707* (2011.01)
*H04L 25/03* (2006.01)
*H04L 25/08* (2006.01)
*H04B 7/005* (2006.01)
*H04B 7/08* (2006.01)

(52) U.S. Cl.
CPC ............ *H04B 1/707* (2013.01); *H04L 25/08* (2013.01); *H04L 25/03987* (2013.01); *H04B 7/005* (2013.01); *H04B 7/0854* (2013.01)

(58) Field of Classification Search
CPC ............ H04L 1/005; H04L 1/0631; H04L 2025/03426; H04L 25/0242; H03F 2201/3224; H04B 1/707; H04B 1/7103
See application file for complete search history.

(56) References Cited

U.S. PATENT DOCUMENTS

| | | | |
|---|---|---|---|
| 2003/0095529 A1* | 5/2003 | Petre et al. | 370/342 |
| 2005/0123075 A1* | 6/2005 | Kim et al. | 375/340 |
| 2006/0109897 A1* | 5/2006 | Guo et al. | 375/232 |
| 2008/0089403 A1* | 4/2008 | Hooli et al. | 375/232 |
| 2008/0130777 A1* | 6/2008 | Landau et al. | 375/267 |
| 2010/0008433 A1* | 1/2010 | Huang et al. | 375/260 |
| 2010/0106762 A1* | 4/2010 | Miyoshi | 708/446 |
| 2014/0098840 A1* | 4/2014 | Christensen | 375/148 |

OTHER PUBLICATIONS

Shenoy, S.P.; Ghauri, I.; Slock, D. T M, "Chip-sparsification and symbol-equalization for WCDMA downlink," Personal, Indoor and Mobile Radio Communications, 2008. PIMRC 2008. IEEE 19th International Symposium on , vol., no., pp. 1,5, Sep. 15-18, 2008.*

(Continued)

*Primary Examiner* — Shuwang Liu
*Assistant Examiner* — Ross Varndell
(74) *Attorney, Agent, or Firm* — McDermott Will & Emery LLP

(57) ABSTRACT

Disclosed are various embodiments for a symbol level Krylov method equalizer implemented in a wireless communications device. An HSDPA or WCDMA signal is input to the wireless communications device. A conjugate gradient method is applied to symbol-level samples of the signal until a termination condition is met. The termination condition may comprise having zero residual error, residual error below a threshold, or a specified number of iterations. Additionally, a preconditioning matrix may be applied to the inputs of the conjugate gradient method.

20 Claims, 3 Drawing Sheets

(56) References Cited

OTHER PUBLICATIONS

Tong, Jun; Schreier, P.J., "Regularized linear equalization for multipath channels with imperfect channel estimation," Acoustics, Speech and Signal Processing (ICASSP), 2012 IEEE International Conference on , vol., no., pp. 3009,3012, Mar. 25-30, 2012.*

Tjitrosoewarno, C.B.; Fukasawa, A.; Takizawa, Y., "Multi-user receiver using conjugate gradient method for wideband CDMA," Circuits and Systems, 2005. ISCAS 2005. IEEE International Symposium on , vol., no., pp. 360,363 vol. 1, May 23-26, 2005.*

* cited by examiner

SYSTEM AND METHOD FOR A KRYLOV METHOD SYMBOL EQUALIZER

BACKGROUND

Wideband code division multiple access (WCDMA) is a third generation (3G) cellular technology that enables the concurrent transmission of a plurality of distinct digital signals via a common RF channel. One such high speed data communications service, which is based on WCDMA technology, is the high speed downlink packet access (HSDPA) service. Current techniques to perform symbol-level equalization of incoming HSDPA or WCDMA signals do not guarantee convergence, as in the Jacobi Method, or are computationally expensive, as in the Gauss-Seidel Method.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
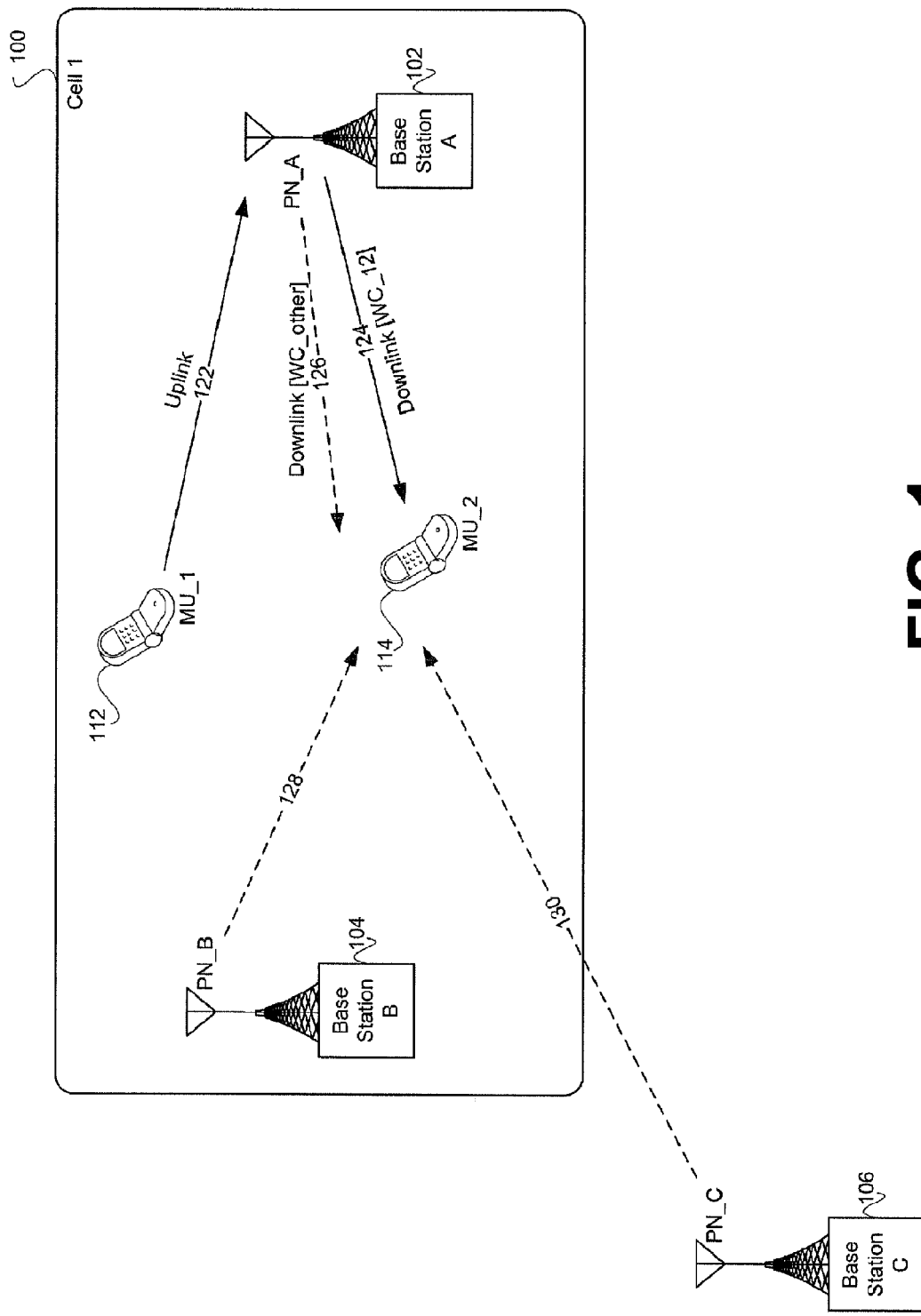
FIG. 1 is an illustration of an exemplary wireless communication system, in accordance with an embodiment.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo-noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, smartphones and/or wireless computing devices, to communicate concurrently via wireless communication networks.

A user utilizing a mobile communication device, MU_1, may be engaged in a communication session with a user utilizing a mobile communication device MU_2 via a base transceiver station, BTS_A within wireless communication network. For example, the mobile communication device MU_1 may transmit a digital signal to the BTS_A, which the base transceiver station BTS_A may then transmit to the mobile communication device MU_2. The base transceiver station BTS_A may encode signals received from the mobile communication device MU_1 and transmitted to the mobile communication device MU_2 by utilizing a Walsh code, W_12, and a PN sequence, PN_A. The mobile communication device MU_2 may receive signals transmitted concurrently by a plurality of base transceiver stations (BTSs) in addition to the base transceiver station BTS_A within a given RF coverage area. The mobile communication device MU_2 may process the received signals by utilizing a descrambling code that is based on the PN sequence PN_A and a despreading code that is based on the Walsh code W_12. In doing so, the mobile communication device MU_2 may detect a highest relative signal energy level for signals received from base transceiver station BTS_A, which comprise a digital signal corresponding to mobile communication device MU_1.

However, the mobile communication device MU_2 may also detect signal energy from the digital signals, which correspond to signals from mobile communication devices other than the mobile communication device MU_1. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU_2. This aggregate noise signal energy level may be referred to as multiple access interference (MAI). The MAI may result from signals transmitted by the base transceiver station BTS_A, which originate from signal received at the base transceiver station BTS_A from mobile communication devices other than mobile communication device MU_1. The MAI may also result from signals transmitted by the base transceiver stations BTSs other than the base transceiver station BTS_A. The MAI and other sources of noise signal energy may interfere with the ability of MU_2 to successfully decode signals received from MU_1.

An additional source of noise signal energy may result from multipath interference. The digital signal energy corresponding to the mobile communication device MU_2, which is transmitted by the base transceiver station BTS_A may disperse in a wavefront referred to as a multipath. Each of the components of the multipath may be referred to as a multipath signal. Each of the multipath signals may experience a different signal propagation path from the base transceiver station BTS_A to the mobile communication device MU_2. Accordingly, different multipath signals may arrive at different time instants at the mobile communication device MU_2. The time duration, which begins at the time instant that the first multipath signal arrives at the mobile communication device MU_2 and ends at the time instant that the last multipath signal arrives at the mobile communication device MU_2 is referred to as a delay spread. The mobile communication device MU_2 may utilize a rake receiver that allows the mobile communication device MU_2 to receive signal energy from a plurality of multipath signals received within a receive window time duration. The receive window time duration may comprise at least a portion of the delay spread time duration. Multipath signals, which are not received within the receive window time duration may also contribute to noise signal energy.

In order to estimate symbol-level data embodied in a communications signal having both symbol data and signal noise, a wireless communications device may employ a symbol-level equalizer. The symbol-level equalizer estimates symbol data as a function of an input signal, channel data, a scrambling code, a spreading code, and noise. This problem may be embodied as the following equation:

$$\bar{y} = HSC\bar{x} + \bar{n}$$

In the preceding equation, $\bar{y}$ is an N×1 vector representing the input signal, such as a WCDMA or HSDPA signal. H is an N×N matrix representing the channel information. S is an N×N matrix representing a scrambling code. C is an N×N matrix representing a spreading code, such as an orthogonal variable spreading factor (OVSF). $\bar{x}$ is an N×1 vector representing the symbol data, and $\bar{n}$ is an N×1 vector representing signal noise. Given this equation, a symbol equalizer calculates $\bar{x}$ using a given HSC and an estimated $\bar{n}$.

An example technique of solving for $\bar{x}$ uses Linear Minimum Mean Squared Error Symbol Equalization (LMMSE Symbol EQ) for the following derivative equation:

$$(\Lambda^{-1} + C^H S^H H^H HSC)\bar{x} = C^H S^H H^H \bar{y}$$

In this equation $\Lambda$ is an N×1 vector representing an estimated noise. Current implementations of LMMSE Symbol EQ may implement iterative matrix solving algorithms such as Jacobi Method or the Gauss-Seidel Method. Jacobi Method-based LMMSE Symbol EQ, such as parallel interference calculation, has low computational complexity, but does not guarantee convergence. Such an implementation may result in undesirable data loss in instances where the operation terminations before convergence. Gauss-Seidel Method-based LMMSE Symbol EQ, such as serial interference calculation, guarantees convergence but has a high computational complexity.

Symbol Level Krylov Method-based Symbol EQ (SyLK-EQ) applies an iterative conjugate gradient method to the preceding equation to solve for the symbol vector. In some embodiments, both sides of the equation are first multiplied by a preconditioning matrix. The iterative conjugate gradient method may be applied using processing circuitry configured to perform the following algorithm:

$$k = 0$$
$$r_0 = b - Ax_0$$
$$\text{while } r_k \neq 0$$
$$\quad \text{Iterate(k);}$$
$$\text{end}$$
$$x = x_k$$

The Iterate(k) step may be embodied as follows:

$$k = k + 1$$
$$\text{if } k = 1$$
$$\quad p_1 = r_0$$
$$\text{else}$$
$$\quad q_k = ||r_{k-1}||^2 / ||r_{k-2}||^2$$
$$\quad p_k = r_{k-1} + q_k p_{k-1}$$
$$\text{end}$$
$$\omega_k = ||r_{k-1}||^2 / p_k^H A p_k$$
$$x_k = x_{k-1} + \omega_k p_k$$
$$r_k = r_{k-1} - \omega_k A p_k$$

The variables of the equation may be defined as follows:

$$A = \Lambda^{-1} + C^H S^H H^H HSC$$

$$b = C^H S^H H^H \bar{y}$$

$$x_0 = 0$$

In the preceding algorithm, the variable $r_k$ represents a residual error of the conjugate gradient method. In some embodiments, the algorithm terminates when $r_k$ equals zero. In another embodiment, the algorithm may terminate when $r_k$ falls below a predetermined threshold. In further embodiments, the algorithm may terminate after a predefined number of iterations.

The algorithm guarantees convergence within a finite number of iterations. Additionally, the complexity per iteration is roughly the same as the Jacobi Method. Furthermore, the algorithm typically converges faster than the Jacobi method.

In various embodiments, the processing circuitry configured to apply the conjugate gradient method is implemented as at least a portion of a microprocessor. The processing circuitry may include one or more circuits, one or more microprocessors, or any combination thereof. In yet other embodiments, processing circuitry may include one or more software modules executable within one or more processing circuits.

The processing circuitry may be implemented in a wireless communications device, such as a mobile phone. The incoming signal to which the conjugate gradient method is applied may comprise an HSDPA signal, a WCDMA signal, a signal conforming to the Universal Mobile Telecommunications System standard, or another signal.

FIG. 1 is an illustration of an exemplary wireless communication system, in accordance with an embodiment. Referring to FIG. 1, there is shown a cell 100 and a BTS C 106. The cell 100 comprises BTS A 102, BTS B 104, mobile communication device MU_1 112 and mobile communication device MU_2 114. The BTS 106 may be located outside of the cell 100.

The mobile communication devices MU_1 112 and MU_2 114 may be engaged in communication via the BTS A 102. The mobile communication device MU_1 112 may transmit signals to the BTS A 102 via an uplink RF channel 122. In response, the BTS A 102 may transmit signals to the mobile communication device MU_2 114 via a downlink RF channel 124. Signals transmitted by the BTS A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the BTS A 102 via the downlink RF channel 124 from signals transmitted concurrently by the BTS A 102 via other downlink RF channels, for example downlink RF channel 126. The BTS A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, the signals received via RF channel 126 may be transmitted by the BTS A 102. The signals received via RF channel 128 may be transmitted by the BTS B 104. The signals transmitted by the BTS 104 may be scrambled based on a scrambling code PN_B. The signals received via RF channel 130 may be transmitted by the BTS C 106. The signals transmitted by the BTS C 106 may be scrambled based on a scrambling code PN_C.

The mobile communication device MU_2 114 may be operable to perform a soft handoff from the current serving BTS A 102 to any of a plurality of BTSs located within the cell 100, for example, the BTS B 104. Accordingly, the mobile communication device MU_2 114 may be operable to process received signals based on scrambling code PN_A and/or scrambling code PN_B. In this regard, the mobile communication device MU_2 114 may send data to the BTS A 102 and/or the BTS B 104, and data destined for mobile communication device MU_2 114 may be received via the BTS A 102 and/or the BTS B 104. Thus, the BTS A 102 and the BTS B 104 may be referred to as "listened" BTSs. Conversely, the mobile communication device MU_2 114 may not be operable to perform a soft handoff from the current serving BTS A 102 to a BTS that is outside of the cell 100—the BTS C 106, for example. In this regard, the mobile communication device MU_2 114 may not transmit data to the BTS C 106 or receive data destined for the mobile communication device MU_2 114 from the BTS C 106. Accordingly, the BTS A 102 and the BTS B 104 may be referred to as "non-listened" BTSs.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

Accordingly, in various aspects of the invention, the mobile communication device MU_2 114 is operable to perform symbol-level equalization on the incoming communications signal to suppress interference resulting from undesired signals transmitted by listened BTSs, or interference from the non-listened BTS 106, or non-listened BTSs.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize a conjugate gradient method of interference calculation. For the mobile communication devices 112 and 114 to process multipath information, each of the channels 124, 126, 128, and 130 may represent multiple paths, where those multiple paths are separated by a time delay.

Figure 2:
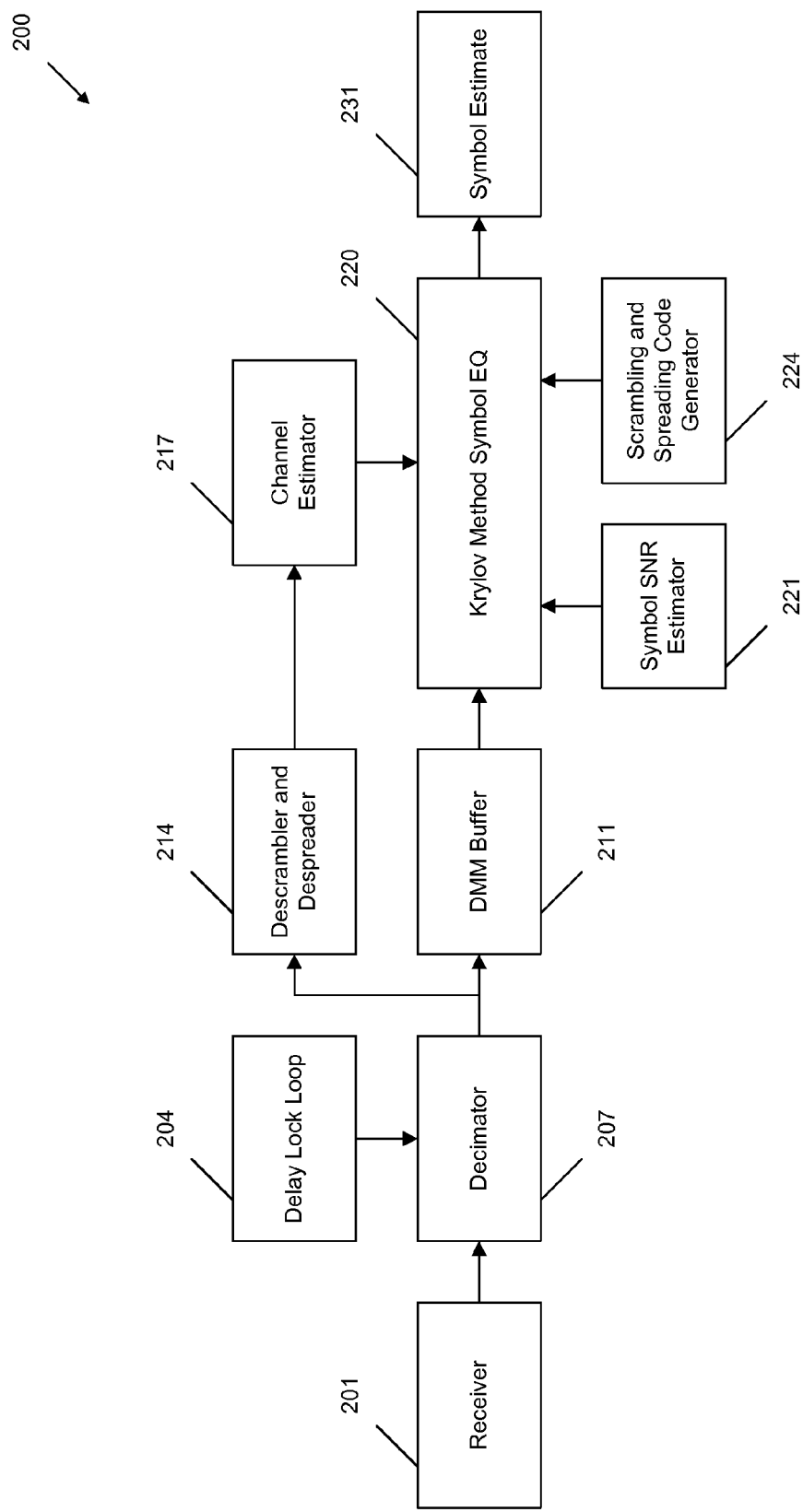
FIG. 2 is a diagram of an exemplary communication device implementing a Krylov Method symbol equalizer, in accordance with an embodiment of the invention.

FIG. 2 is a diagram of an exemplary wireless communications device 200 in accordance with an embodiment of the invention.

The receiver 201 may comprise suitable logic, circuitry, interfaces and/or code that may be operable to perform functions that may comprise PHY layer function for the reception of signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via a receiving antenna.

The delay lock loop 204 comprises suitable logic, circuitry, interfaces and/or code that may be operable to change the phase of a clock signal or to perform clock recovery. The signal from the receiver 201 and the clock signal from the delay lock loop are input into a decimator 207. The decimator 207 comprises suitable logic, circuitry, interfaces and/or code that may be operable to reduce the sampling rate of a signal from the receiver 201 and generate chip-level samples.

The output of the decimator 207 is output to a delay matched memory (DMM) buffer 211. The DMM buffer 211 may comprise suitable logic, circuitry, code and/or interfaces that are operable to receive and delay block data. Additionally, output from the decimator 207 is provided as input to a descrambler and despreader 214. The descrambler and despreader 214 comprises suitable logic, circuitry, code and/or interfaces that are operable to generate symbol-level samples. Despreading may be accomplished by applying an OSVF code such as a Walsh code, or by another despreading approach.

Next, the output from the decimator and descrambler 214 is provided as input to a channel estimator 217. The channel estimator 217 comprises suitable logic, circuitry, code and/or interfaces that are operable to generate channel estimate values for the input symbol-level samples as a channel estimate value matrix.

Output from the DMM Buffer 211 as a signal vector and a channel estimate matrix output from the channel estimator 217 are input to the Krylov Method Symbol Equalizer (EQ) 220. An estimated noise vector generated by a symbol signal-to-noise Ratio (SNR) estimator 221 is input to the Krylov Method Symbol EQ 220. Additionally, a scrambling code matrix and spreading code matrix are generated by a scrambling and spreading code generator 224 and input to the Krylov Method Symbol EQ 220.

The Krylov Method Symbol EQ 220 performs an iterative conjugate gradient method on the inputs from the DMM buffer 211, the channel estimator 217, the symbol SNR estimator 221 and the scrambling and spreading code generator 224 until a termination condition is met. The termination condition may comprise a residual error of zero, a residual error falling below a predefined threshold, executing a predefined number of iterations, or another condition. The Krylov Method Symbol EQ 220 thereby generates a symbol estimate 231.

Figure 3:
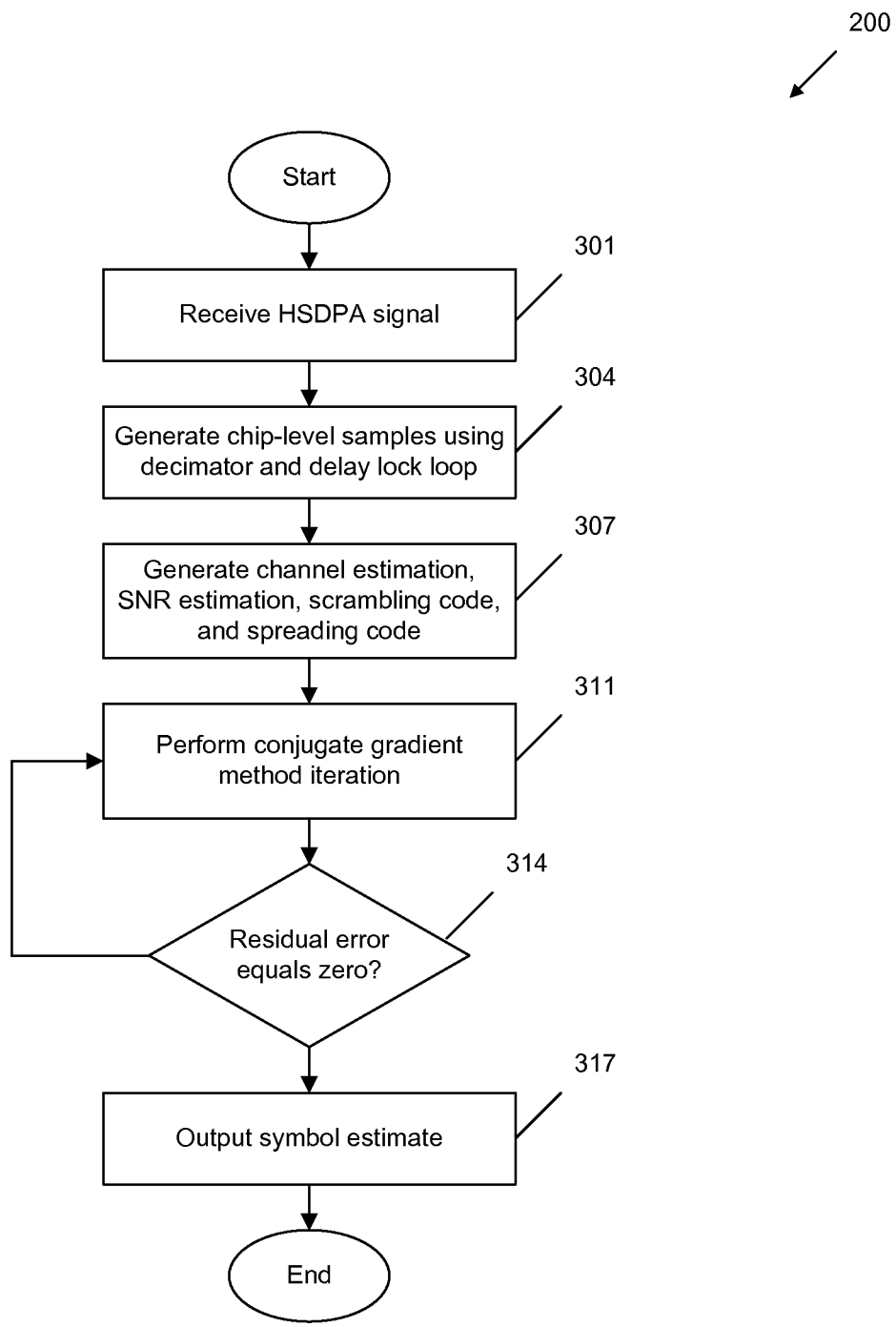
FIG. 3 is a flowchart illustrating one example of functionality implemented as portions of an exemplary communication device implementing a Krylov Method symbol equalizer.

Referring next to FIG. 3, shown is a flowchart that provides one example of the operation of a portion of an exemplary wireless communications device 200 (FIG. 2) according to various embodiments. It is understood that the flowchart of FIG. 3 provides merely an example of the many different types of functional arrangements that may be employed to implement the operation of the portion of an exemplary wireless communications device 200 as described herein.

Beginning with reference number 301, the wireless communications device receives an HSDPA signal. This may be performed by a receiver 201 (FIG. 2), or other suitable logic, circuitry, or functionality. Next, in reference number 304, the wireless communications device generates chip-level samples using the delay lock loop 204 (FIG. 2) and the decimator 207 (FIG. 2). In reference number 307, the wireless communications device generates a channel estimation, SNR estimation, scrambling code, and spreading code. Generating the channel estimation may be performed by a channel estimator 217 (FIG. 2) as a function of symbol-level samples output by a descrambler and despreader 214 (FIG. 2) or other input. The channel estimation may comprise a channel estimation matrix. The SNR estimation may comprise an estimated SNR vector generated by a symbol SNR estimator 221 (FIG. 1). The scrambling code and spreading code may comprise a scrambling code matrix and a spreading code matrix generated by a scrambling and spreading code generator 224 (FIG. 2).

In reference number 311, the Krylov Method symbol EQ 220 (FIG. 2) performs an iteration of a conjugate gradient method. Subsequent iterations are performed until the residual error equals zero as shown in reference number 314. Once the residual error reaches zero, the symbol estimate 231 (FIG. 2) is output in reference number 317.

The flowcharts of FIG. 2 show the functionality and operation of an implementation of portions of a wireless communications device implementing a Krylov Method symbol equalizer. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including logic operational in a wireless communications device implementing a Krylov Method symbol equalizer, that comprises software or code can be embodied in any transitory propagation medium or non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device. The transitory propagation medium may comprise light, signals, waveforms, electrical transmissions, or other propagation media.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for signal processing comprising:
   one or more circuits for use in a wireless communication device, wherein the one or more circuits comprise:
   an interface configured to receive a communications signal ($\bar{y}$) comprising symbol data ($\bar{x}$) and signal noise ($\bar{n}$); and
   a symbol-level equalizer configured to generate an estimated symbol data by performing an iterative conjugate gradient method as a function of the communications signal and a channel model including channel information (H),
   wherein the symbol-level equalizer is configured to perform the iterative conjugate gradient method by receiving a scrambling code matrix (S) and a spreading code matrix (C) from a scrambling and spreading code generator, and to determine the symbol data ($\bar{x}$) based on: $\bar{y}=HSC\bar{x}+\bar{n}$,
   wherein the symbol-level equalizer is configured to terminate the iterative conjugate gradient method based on a residual error falling below a predefined threshold.

2. The system of claim 1, wherein the iterative conjugate gradient method further comprises calculating the residual error, and the iterative conjugate gradient method is terminated responsive to the residual error equaling zero.

3. The system of claim 1, wherein the iterative conjugate gradient method is terminated after a predefined number of iterations.

4. The system of claim 1, wherein the one or more circuits are operable to apply a preconditioning matrix to the communications signal and the channel model, generating a preconditioned communications signal and a preconditioned channel model, and the iterative conjugate gradient method is performed as a function of the preconditioned communications signal and the preconditioned channel model.

5. The system of claim 1, wherein the communications signal comprises a wideband code division multiple access (WCDMA) signal.

6. The system of claim 1, wherein the communications signal comprises a high speed downlink packet access (HSDPA) signal.

7. The system of claim 1, wherein the communications signal conforms to a Universal Mobile Telecommunications System (UMTS) standard.

8. The system of claim 1, wherein the signal noise comprises inter-cell interference.

9. The system of claim 1, wherein the signal noise comprises intra-cell interference.

10. A method for a processing circuit implemented in a wireless communications device, comprising the steps of:
    receiving a communications signal ($\bar{y}$) comprising ($\bar{x}$) and signal noise ($\bar{n}$);
    performing an iterative conjugate gradient method as a function of the communications signal and a channel model including channel information (H) to generate an estimated symbol data;
    wherein performing the iterative conjugate gradient method comprises:
    receiving a scrambling code matrix (S) and a spreading code matrix (C) from a scrambling and spreading code generator, and determining the symbol data ($\bar{x}$) based on: $\bar{y}=HSC\bar{x}+\bar{n}$; and terminating the iterative conjugate gradient method based on a residual error falling below a predefined threshold.

11. The method of claim 10, wherein the step of performing iterative conjugate gradient method further comprises the steps of:
    calculating, for each iteration, the residual error; and
    terminating the iterative conjugate gradient method responsive to the residual error equaling zero.

12. The method of claim 10, wherein the step of performing iterative conjugate gradient method further comprises the step of terminating the iterative conjugate gradient method after a predefined number of iterations.

13. The method of claim 10, further comprising the steps of:
    applying a preconditioning matrix to the communications signal and the channel model to generate a preconditioned communications signal and a preconditioned channel model; and
    wherein the step of performing the iterative conjugate gradient method is performed as a function of the preconditioned communications signal and the preconditioned channel model.

14. The method of claim 10, wherein the communications signal comprises a wideband code division multiple access (WCDMA) signal.

15. The method of claim 10, wherein the communications signal comprises a high speed downlink packet access (HSDPA) signal.

16. The method of claim 10, wherein the communications signal conforms to a Universal Mobile Telecommunications System (UMTS) standard.

17. The method of claim 10, wherein the signal noise comprises inter-cell interference.

18. The method of claim 10, wherein the signal noise comprises intra-cell interference.

19. A communication device comprising:
    an interface circuit configured to receive a communications signal ($\bar{y}$) comprising symbol data ($\bar{x}$) and signal noise ($\bar{n}$); and
    a symbol-level equalizer circuit configured to generate an estimated symbol data by performing an iterative conjugate gradient method as a function of the communications signal and channel information (H),
    wherein the symbol-level equalizer is configured to perform the iterative conjugate gradient method by receiving a scrambling code matrix (S) and a spreading code matrix (C) from a scrambling and spreading code generator, and to determine the symbol data ($\bar{x}$) based on:
    $\bar{y} = HSC\bar{x} + \bar{n}$.

20. The communication device of claim 19, wherein:
    the symbol-level equalizer is configured to terminate the iterative conjugate gradient method based on a residual error falling below a predefined threshold,
    the iterative conjugate gradient method further comprises calculating the residual error, and the iterative conjugate gradient method is terminated responsive to the residual error equaling zero, and
    $\bar{y}$ comprises an N×1 vector representing the communication signal,
    H comprises an N×N matrix representing channel information,
    S comprises an N×N matrix representing a scrambling code,
    C comprises an N×N matrix representing a spreading code, and
    $\bar{n}$ comprises an N×1 vector representing the signal noise.

* * * * *